United States Patent [19]
Boothman et al.

[11] 3,848,160
[45] Nov. 12, 1974

[54] CIRCUIT FOR DETECTING PHASE UNBALANCE IN A THREE PHASE SUPPLY

[75] Inventors: David Richard Boothman, Ennismore; David Walter Nutt, Peterborough, Ontario, both of Canada

[73] Assignee: Canadian General Electric Company, Limited, Toronto, Ontario, Canada

[22] Filed: May 21, 1973

[21] Appl. No.: 362,366

[52] U.S. Cl............. 317/27 R, 317/33 R, 317/36 TD
[51] Int. Cl.............................................. H02h 3/26
[58] Field of Search...... 317/27 R, 47, 33 R, 33 SC, 317/36 TD, 33 C; 307/231, 232; 323/119, 101; 318/314; 324/83, 86, 107; 328/133

[56] References Cited
UNITED STATES PATENTS

| | | | |
|---|---|---|---|
| 3,568,057 | 3/1971 | Povey | 307/232 |
| 3,584,259 | 6/1971 | Traub et al. | 317/27 R |
| 3,621,452 | 11/1971 | Ho | 307/232 |

FOREIGN PATENTS OR APPLICATIONS

| | | | |
|---|---|---|---|
| 1,281,559 | 10/1968 | Germany | 324/83 R |

Primary Examiner—J. D. Miller
Assistant Examiner—Patrick R. Salce
Attorney, Agent, or Firm—James H. Beusse; Harold H. Green, Jr.

[57] ABSTRACT

According to the invention an AC voltage, which is a function of line current, is obtained from each line of a three phase AC source. A half-wave rectifier converts the three AC voltages into three trains of pulses of like polarity. Two different ones of the three trains of pulses are applied to the two inputs of each one of three differential integrating circuits. Each circuit integrates the difference of its inputs and gives an output voltage which is proportional to this difference. The voltages of one polarity are selected from the outputs of the three differential integrating circuits and summed. The level of this sum represents the current imbalance of the source. A level detector may be used to detect this voltage level and initiate a control function in response to a predetermined level. A time delay will usually be provided to delay the control function.

9 Claims, 5 Drawing Figures

CIRCUIT FOR DETECTING PHASE UNBALANCE IN A THREE PHASE SUPPLY

BACKGROUND OF THE INVENTION

This invention relates to a circuit for detecting an imbalance of phase currents in a three phase AC supply.

Most three phase AC loads may be regarded as symmetrical three phase balanced loads, for example, three phase motors. However, in practice, there are some differences in the currents supplied to the load. These differences can usually be ignored because they are so small that they do the machine no harm. In the case of motors driving industrial loads, the current imbalance is usually due to differences in phase voltages caused by unbalanced loads elsewhere on the system. For example, one or more heavy single phase loads on a system will lead to voltage differences in the supply to the motor.

To understand the effect of unbalanced currents upon an induction or synchronous motor, it is necessary to make use of symmetrical component theory. Any comprehensive three phase circuit theory text book will give a full understanding of symmetrical component theory and so it is proposed to consider here the implications of the theory as applied to a motor. The basis of the theory states that any unsymmetrical or unbalanced three phase current system may be resolved into three separate symmetrical balanced component systems which may be added together to equal the unbalanced system. These three component systems are given names as follows:

1. The "Positive Phase Sequence Components" — a balanced system rotating in the same direction as the parent system.
2. The "Negative Phase Sequence Components" — a balanced system rotating in the opposite direction to the parent system.
3. The "Zero Phase Sequence Component" — a balanced system which is stationary.

If it is assumed that there is no neutral connection and that there is also no ground fault on the load side of the point at which the currents are measured, then the "Zero Phase Sequence Component" can be shown to have zero magnitude and thus may be ignored.

The positive phase sequence component of current provides the driving torque to the motor. The negative phase sequence component, because it produces a field rotating in the opposite direction, produces a torque in the opposite direction. Since the magnitude of this second torque is much smaller than the magnitude of the torque produced by the positive phase sequence component, the net output torque of the machine is not usually reduced significantly. What does result, however, is an increase in the rotor running temperature out of all proportion to the small percentage of negative phase sequence current that is causing it. By way of explanation for this excessive heating, it can be seen that the forward rotating magnetic field from the positive phase sequence component induces a current in the rotor whose frequency is equal to the slip frequency because the rotor is rotating in the same direction as the field but at a speed less than that of the field by an amount equal to the slip. The reverse rotation magnetic field from the negative phase sequence component, however, induces a current in the rotor whose frequency is equal to twice the synchronous frequency less the slip frequency. Typically this could be of the order of 115 Hertz for an induction motor and 120 Hertz for a synchronous motor. A machine is designed to tolerate small negative phase sequence currents, but for every machine there is a limit beyond which its life will be unduly shortened if permitted to operate continuously with a negative phase sequence component of current beyond that limit.

The obvious way to protect a rotor against excessive heating due to the negative phase sequence components is to monitor the motor line currents with a device capable of extracting the negative phase sequence components and indicating their magnitude. Upon their magnitude attaining a predetermined level, the device initiates a control function, e.g., trips the breaker and thereby shuts down the motor. The time elapsed before the breaker trips will be inversely related to the magnitude of the components. Unfortunately, known negative phase sequence component measurement circuits are frequency sensitive and must be tuned to the power system frequency, which in Canada is standardized at 60 Hertz. If such circuits are used at any other frequency, the incorrect outputs will result, and moreover, deviations from pure sine waves introduce harmonic frequency components, which components lead to incorrect outputs. Direct sensing of the negative phase sequence components of current is possible in many situations, but an industrial distribution system is not one of these. Industrial power systems supply power to much equipment which distorts the waveform, e.g., thyristor power supplies, cycloconverters, and inverters.

Because it is not practical to measure the negative phase sequence components directly, it has become the accepted practice to arrive at measurements indirectly by measuring current imbalance between phases. It is well known that the imbalance of line currents in a three phase system is the source of the negative phase sequence components. The relation between the current imbalance and the components is somewhat complex, involving both magnitude and phase angles. By detecting current imbalance, it is possible to approximate the magnitude of the negative phase sequence components. This invention follows the latter technique of current imbalance in the detection of the negative phase sequence components.

According to the invention an AC voltage, which is a function of line current, is obtained from each line of a three phase AC source. A half-wave rectifier converts the three AC voltages into three trains of pulses of like polarity. Two different ones of the three trains of pulses are applied to the two inputs of each one of three differential integrating circuits. Each circuit integrates the difference of its inputs and gives an output voltage which is proportional to this difference. The voltages of one polarity are selected from the outputs of the three differential integrating circuits and summed. The level of this sum represents the current imbalance of the source. A level detector may be used to detect this voltage level and initiate a control function in response to a predetermined level. A time delay will usually be provided to delay the control function.

The invention will now be described with reference to the attached drawings, in which FIG. 1 is a block diagram of a circuit for detecting current imbalance in a three phase AC source;

DESCRIPTION OF THE PREFERRED EMBODIMENT

Figure 1:
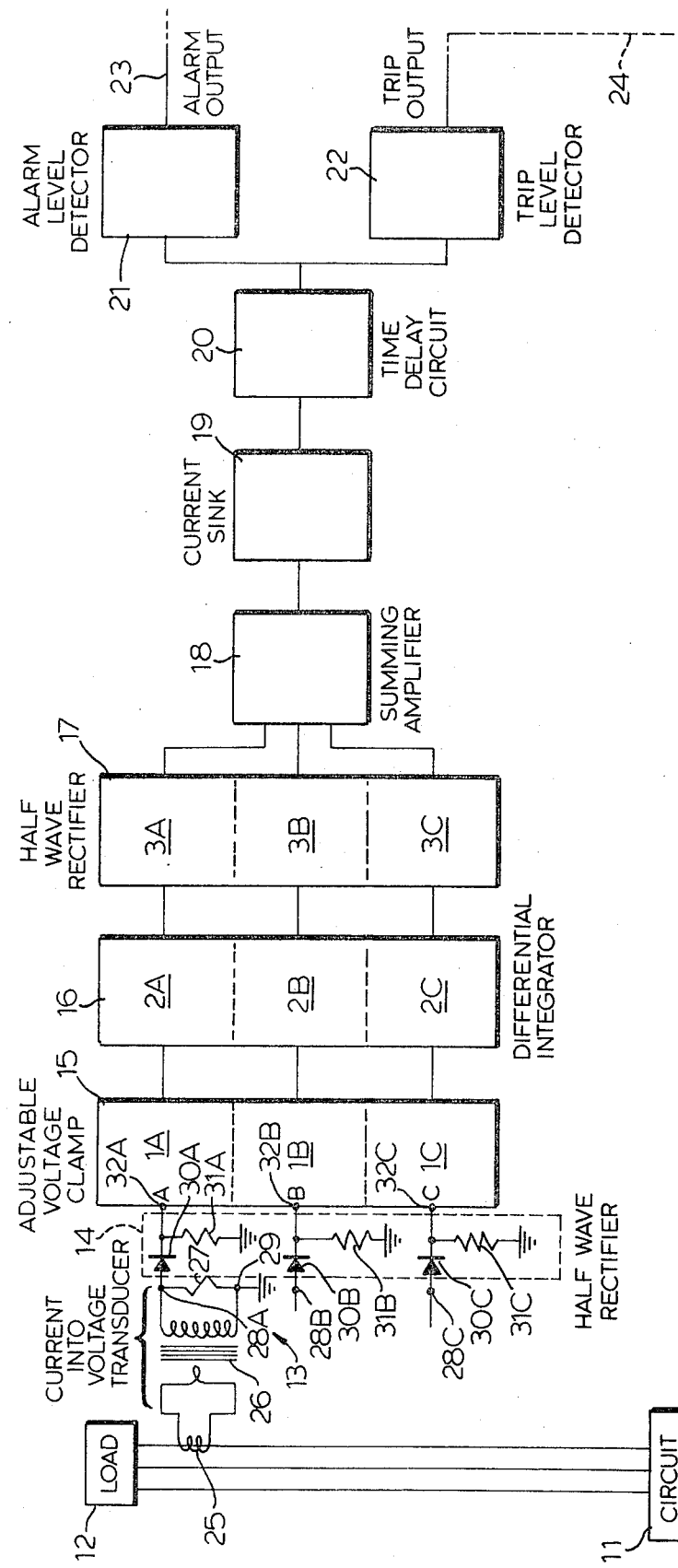

FIG. 1 shows a preferred embodiment of the invention as a number of circuit components in block form connected in the sequence of signal processing beginning with detection on the left and ending with outputs on the right. It consists essentially of the following: a three phase AC supply connected through a circuit breaker 11 to a load 12 such as an induction motor by means of three power lines 10; a current into voltage transducer 13 for each line 10; a half wave rectifier 14; an adjustable voltage clamp 15; a differential integrator 16; a half wave rectifier 17; a summing amplifier 18; a current sink 19; a time delay circuit 20; level detectors 21 and 22; conductors represented by the dashed line 23 for connecting the output terminals of the alarm level detector 21 to an alarm device; and conductors represented by the dashed line 24 connecting the output terminals of the trip level detector 22 to circuit breaker 11.

The current into voltage transducer shown at 13 consists of a low ratio current transformer 25 coupled to a line 10 and a high ratio transformer 26 burdened by a resistor 27 connected to its secondary terminals 28A and 29. A diode 30A of the half wave rectifier 14 has its anode connected to terminal 28A and its cathode to an input terminal 32A on section 1A of the adjustable voltage clamp 15. The cathode of the diode is also connected through a resistor 31A to ground. Terminal 29 is also connected to ground. There is one transducer 13 for each line 10, and one half wave rectifier section 30 and 31 for each transducer. Each one of the power lines is therefore coupled with a different one of the voltage clamp sections 1A, 1B and 1C by way of a transducer and a rectifier section. Hence each one of the clamp sections 1A, 1B and 1C receives a train of positive pulses which represents the alternating current in a different one of the power lines. These inputs at terminals 32A, 32B and 32C are represented by the capital letters A, B and C respectively. Theoretically, the resistors 31 are not essential for operation of rectifier 14; they are provided to ensure sufficient current flow through the diodes to maintain an even voltage drop across them.

As in the case of rectifier 14, blocks 15, 16 and 17 also contain three sections of like circuits. The section components that are alike in a block are identified by the same numbers, followed by one of the letters A, B or C designating the section. In the description to follow, reference will be made to the number only when speaking about the component without regard to its section and to the number and letter when identifying the section as well.

Figure 2:
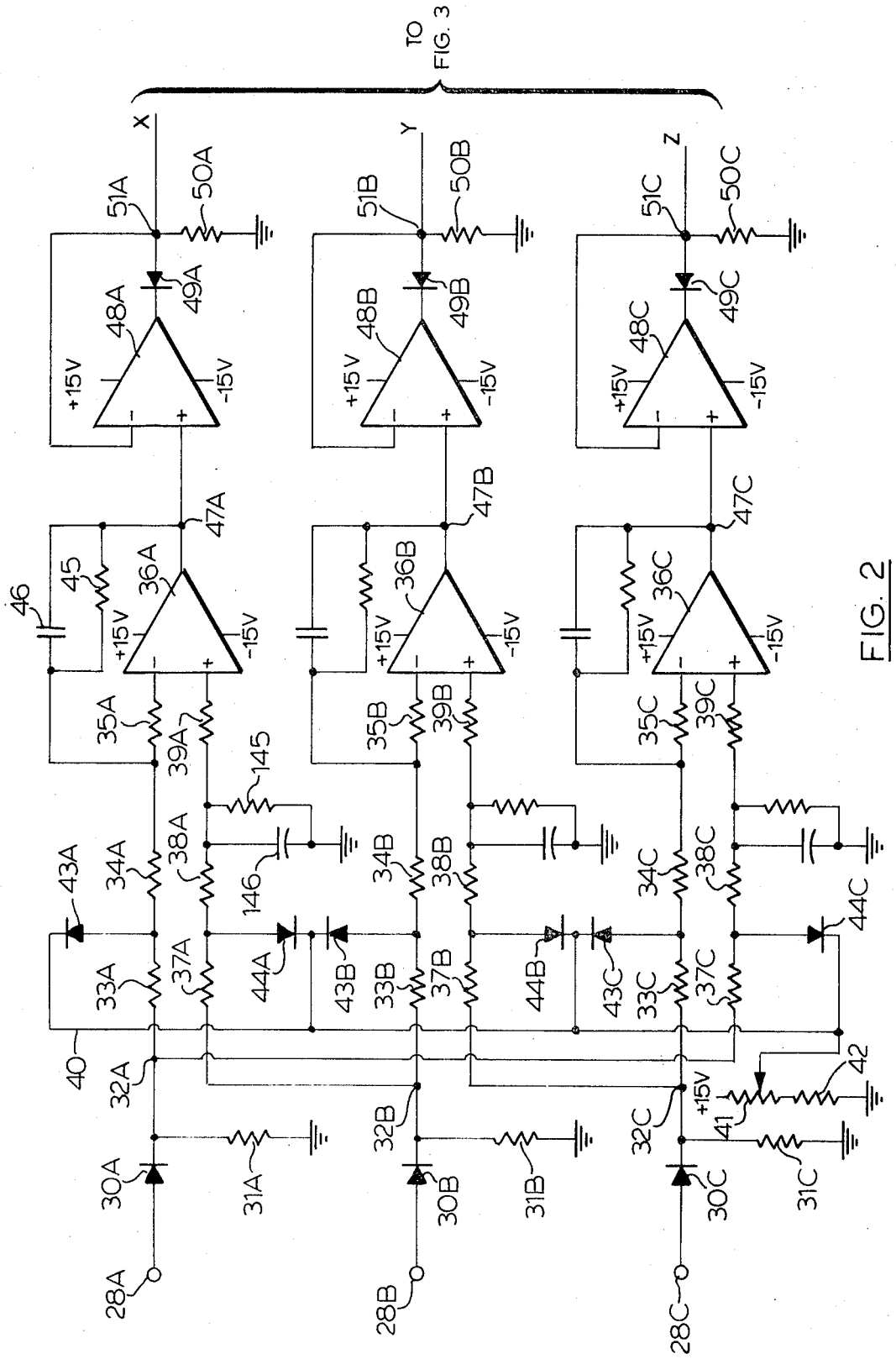
FIGS. 2 and 3 is a circuit diagram of FIG. 1, FIG. 2 showing half the circuit and FIG. 3 the other half.

Referring now to FIG. 2, terminal 32A is connected through the series resistors 33A, 34A and 35A to the negative input of an operational amplifier 36A, and also through the series resistors 37C, 38C and 39C to the positive input of operational amplifier 36C. Terminal 32B is similarly connected through resistors 33B, 34B and 35B to the negative input of operational amplifier 36B, and also through resistors 37A, 38A and 39A to the positive input of amplifier 36A. Terminal 32C is similarly connected through resistors 33C, 34C and 35C to the negative input of amplifier 36C, and also through resistors 37B, 38B and 39B to the positive input of amplifier 36B. Resistors 33 and 37 are a part of voltage clamp 15. The clamp also includes a common conductor 40 connected to an adjustable voltage source 41, 42 and the diodes 43 and 44. In each of the operational amplifier inputs, diode 43 has its anode connected between resistors 33 and 34, and diode 44 has its anode connected between resistors 37 and 38. The cathodes of both diodes are connected to conductor 40.

Each one of the sections 2A, 2B and 2C of differential integrator 16 includes an operational amplifier 36 having input resistors 34 and 38, protective resistors 35 and 39, and two integrating circuits. The integrating circuit to the negative input (inverting input) consists of a resistor 45 and a capacitor 46 in parallel from the amplifier output terminal 47 to a point between resistors 34 and 35; and the integrating circuit to the positive input (now inverting input) consists of resistor 145 and capacitor 146 in parallel to ground from a point between resistors 38 and 39. A basic differential integrator is shown on page 52, first edition, Handbook of Operational Amplifier Applications, Burr-Brown Research Corporation, Tucson, Ariz. Resistors 45 and 145 are connected across capacitors 46 and 146 respectively to give the circuit a relatively long time constant for purposes to be considered later.

Each one of the sections 3A, 3B and 3C of the half wave rectifier 17 consists of an operational amplifier 48, a diode 49 and a resistor 50 connected together in the mode of a half wave rectifier. This is necessary because the voltage from terminal 47 is less than the threshold voltage of a diode; hence a simple diode cannot be used. An amplifier with a diode in its feedback loop provides an essentially linear half wave rectifying function down to a very low voltage level. Negative voltages appear at the output terminals 51 of rectifier 17.

Figure 3:
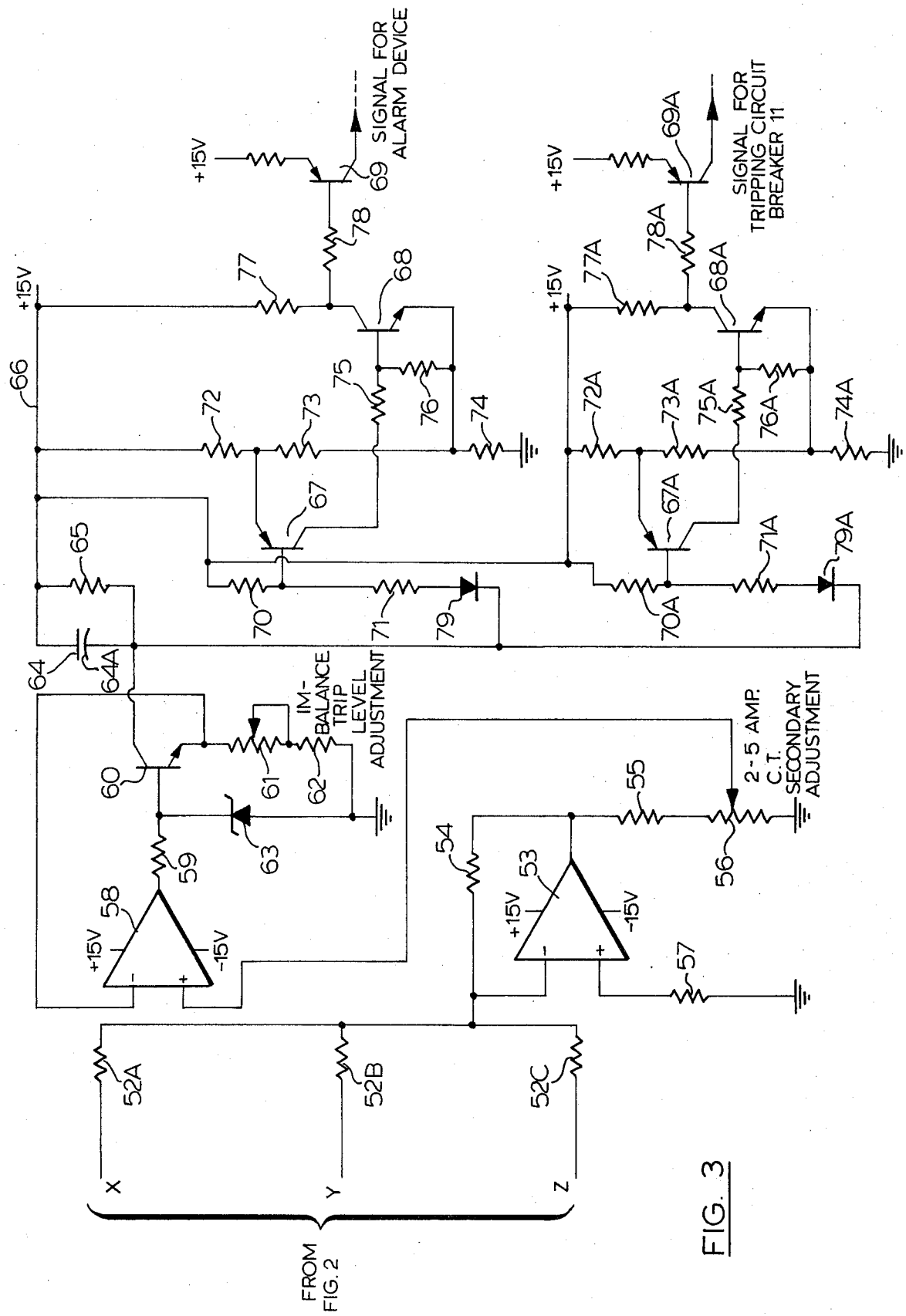

Referring now to FIG. 3, the output voltages of rectifier 17 at its terminals 51 are impressed upon the negative input of an operational amplifier 53 of the summing amplifier 18 via an amplifier input resistor 52 in each line from 51 to 53. Amplifier 53 is provided with a feedback resistor 54. It has two resistors 55 and 15 connecting its output to ground and a resistor 57 connecting its positive input to ground. The output from amplifier 53 is a voltage proportional to the sum of all the negative differences, i.e., the sum from 51A, 51B and 51C. Resistor 56 is adjustable so that a portion of the amplifier output voltage can be taken and applied to the current source 19. This control normalizes the level of the input to source 19 over a full load input current range of the current transformer 25, which range is normally 2 to 5 amperes.

Current sink 19 has an operational amplifier 58 with its positive input connected to the slider of resistor 56 and its output connected through a resistor 59 to the base of a transistor 60. the emitter of the transistor is connected to the negative input of the amplifier and also to ground via resistors 61 and 62, of which 62 is adjustable for purposes of balancing trip levels, if necessary. A zener diode 63 connected between ground and the base of the transistor limits the voltage on the base of the transistor. The collector of the transistor is connected to the time delay circuit 20.

Circuit 20 is a conventional capacitor - resistor time delay comprising capacitor 64 and resistor 65 in parallel. One terminal of this parallel combination is connected to the collector or transistor 60 and the other to a positive bus 66. The circuit has a fairly long time constant, e.g., 100 seconds, and delays the operation of the voltage level detectors 21 and 22 for a period of time after the unbalance in lines 10 occurs. The duration of the delay is a function of the extent of the imbalance. It is introduced to prevent an alarm being given and the breaker being tripped from temporary imbalances; an alarm signal and breaker tripping are not wanted until the temperature of the rotor of the machine has risen to a predetermined level.

Detectors 21 and 22 contain the same circuits; they differ only in the values of circuit components so that 21 gives an output signal a little sooner than 22. Detector 21 comprises three transistors 67 to 60, nine resistors 70 to 78 and a diode 79 connected together in the configuration shown and to the bus and time delay circuit. The output from transistor 69 is applied to operate an alarm device. In detector 22 corresponding components carry the same numbers with a suffix "A." The output from transistor 69A is applied to the tripping of circuit breaker 11.

The operation of the system shown in FIGS. 1 to 3 will now be described. The outputs from the three current into voltage transducers may be regarded as three separate AC voltages of phase displacement and magnitude determined by the currents flowing in lines 10 to 12. These voltages appear at terminals 28A, 28B and 28C respectively as the three sine waves 80A, 80B and 80C illustrated in FIG. 4. If the line currents are in balance, i.e., positive phase sequence components only, then the voltage at the respective terminals 28 will be 120° out of phase and of equal magnitude. If, however, they are not in balance, i.e., negative phase sequence components are present, then the phase relation will be something other than 120° and the magnitudes will differ, which is usually the case. This system is designed to monitor these differences and initiate control functions when they become excessive.

Rectifier 14 removes the negative half of each cycle 80 so that the three trains of positive pulses 81A, 81B and 81C shown in heavy outline remain. These voltages appear at terminals 32. As pointed out earlier, the presence of resistors 31 cause sufficient current flow through the diodes to ensure that their forward drops are fairly evenly matched.

Figure 4:
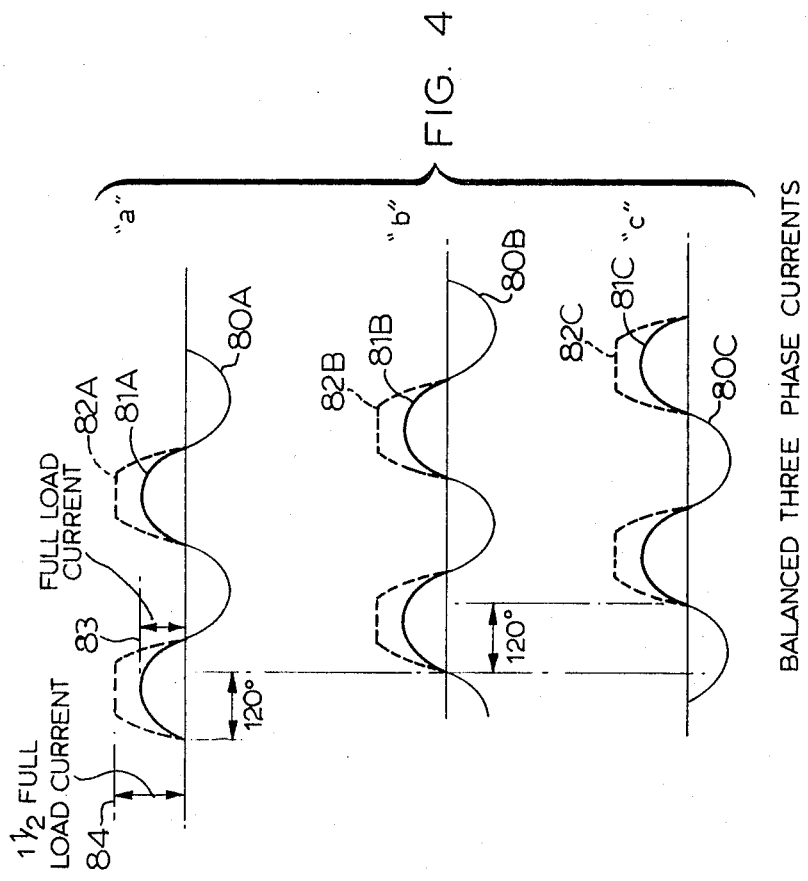
FIG. 4 is a graphical representation of the pulses applied to the inputs of the differential integrating circuits.

The adjustable voltage clamp 15 sets a maximum value on the amplitude of the positive pulses 81. These maximum values are illustrated in FIG. 4 by the dashed lines 82A, 82B and 82C. The maximum values are set by adjusting the slider of resistor 41, and typically will be set for a voltage representing 1.5 times the full load current of load 12. Pulses 81 are shown in FIG. 4 as rising to a level 83 representing the full load current, i.e., normal operating conditions. It is only during abnormal conditions that they will rise above level 83 and then no higher than level 84 where clipping occurs. Whenever the voltages on the anodes of diodes 43 and 44 exceed the voltage set by resistor 41, the diodes conduct to ground via resistors 33, 37, 41 and 42, resistors 33 and 37 acting as ballast in the conductive circuit. A voltage clamp such as this is provided to prevent nuisance tripping of breaker 11 during motor starting when the current imbalance may be very high. At the lower rotor speeds, the losses due to the negative phase sequence currents are less significant.

The inputs of each one of the operational amplifiers 36 of the differential integrator 16 receive the train of pulses 81 from two different ones of the three phases A, B and C. Each one of the circuits comprising components 34, 35, 36, 38, 39, 45, 46, 145, 146 and 147 then integrates the difference between the two signals and gives a DC output voltage which is proportional to the difference and directly related to the gain of the amplifier circuit. The time constant of the amplifier circuit is such that the integrating function is more in the nature of a filtering action than an integrating function, e.g., a time constant of 0.15 seconds will give a filtering action. Without resistors 45 and 145 the circuit will be a true differential integrator. Resistors 45 and 145 limit the output of the operational amplifier so that it is proportional to the difference of the two inputs. A filtering action such as this provides a DC output voltage at terminal 47 substantially free from ripple. There is also some signal amplification in the differential integrator, e.g., a gain of about 1.5. If the signals put into the three integrating circuits from the three phases A, B and C are designated $a$, $b$ and $c$ respectively, then the output voltage at 47A will be $(b-a)$, at 47B $(c-b)$ and at 47C $(a-c)$. Hence these DC output voltages will be either positive or negative depending upon the relative values of $a$, $b$ or $c$.

The half wave rectifier 17 eliminates all of the positive voltages from terminals 47 so that the voltages appearing on terminals 51 are negative DC voltages only. The reason for keeping the negative voltages only will become apparent later. As pointed out earlier, the circuit composed of amplifier 48, diode 49 and resistor 50 operates as a linear half wave rectifier, and it is used because the voltage levels are very low.

Summing amplifier 18 sums all the voltages put out by rectifier 17. The output from this circuit is a voltage proportional to the sum of all the negative differences. Resistor 56 is adjustable to provide control of the fraction of the output voltage that is applied to current sink 19. This control feature normalizes the level of the input to the current sink over the full load input range of current transformers 25, which is usually 2 to 5 amperes secondary current.

In the current sink 19, transistor 60 draws current from capacitor 64 in the time delay 20 and passes it from collector to emitter through resistors 61 and 62 to ground. The magnitude of the current drawn is controlled by operational amplifier 58 in response to the voltage from the summing amplifier. This current finds a value where the voltage drop across resistors 61 and 62 is equal to the voltage impressed on the positive input of amplifier 58, i.e., the two input voltages to amplifier 58 are equal. It is to be noted that the emitter of transistor 60 is connected directly to the negative input of amplifier 58, and the output of summing amplifier 18 to its positive input. Hence the control exercised by amplifier 58 over transistor 60 will be such that its collector-emitter current is kept at a value that makes the drop across resistors 61 and 62 equal to the voltage at the positive input of the amplifier. This, of course, drains current off electrode 64A of capacitor 64, causing its voltage to fall accordingly.

The time delay circuit 20 has a fairly long time constant, e.g., 100 seconds. Initially, with no imbalance on the three phase power source, capacitor 64 carries no charge, i.e., both its terminals are at the voltage on bus 66. When an imbalance occurs, the current source 19 draws current from the capacitor. As a result, the voltage on the lower capacitor electrode 64A falls at a rate depending on the magnitude of the current drawn. After a time delay governed by the values of capacitor 64 and resistor 65, a steady state voltage is established on the electrode. The magnitude of this voltage represents the extent of the power source imbalance.

The voltage on electrode 64A of capacitor 64 is detected by level detectors 21 and 22. When it falls, i.e., becomes less positive, to a level indicating that the currents in lines 10 are approaching an excessive imbalance, detector 21 causes an alarm to be given after a certain time delay. If the imbalance worsens to the point that load 12 may be harmed, detector 22 causes breaker 11 to disconnect the load after a further time delay. In other words, the alarm and tripping signals are given some time after the imbalance occurs. Time delay circuit 20 has a memory; a second imbalance will be detected sooner than a first due to the charge left on capacitor 64 from the first imbalance. The length of this memory is determined by the value of resistor 65, which in turn is related to the cooling rate of the rotor of machine 12.

The operation of level detector 21 will now be described with reference to FIG. 3. Resistors 70, 71 and diode 79 are connected in series across capacitor 64. The diode remains non-conductive until the voltage on electrode 64A of capacitor 64 falls to the alarm level, at which point the diode turns conductive and places essentially the electrode voltage on the base of transistor 67. Resistors 72, 73 and 74 constitute a voltage divider for placing voltages on the emitters of transistors 67 and 68. The voltage applied to the emitter of transistor 67 is less negative than the voltage on electrode 64A plus the forward breakover voltage of diode 79. Hence breakover of the diode turns the transistor on. When transistor 67 turns on, a portion of its collector current flows into the base of transistor 68, causing the latter to turn on. Resistor 76 regulates this current portion and resistor 75 limits the current flow. With transistor 68 turned on, the voltage drop across resistor 74 is increased, thus raising the voltage to the emitter of transistor 67 and thereby causing it to turn on harder. This, in turn, increases the base current of transistor 68 and it, too, turns on harder. With transistor 68 fully on, transistor 69 is turned on to energize the alarm device.

Resistor 71 limits the current flowing from the base of transistor 67 through diode 79 to electrode 64A of capacitor 64. This is necessary to operate the two circuits 21 and 22 from one time delay circuit. Without resistor 71, circuit 21 would take all the capacitor current, leaving none for circuit 22. Resistor 70 provides an emitter cut-off for transistor 67. This prevents leakage in the transistor from being amplified and appearing as an amplified signal on the collector of the transistor.

Level detector 22 is the same as detector 21 except for the resistance values of resistors 72A and 73A in the emitter voltage divider. Their values are such that the voltage applied to the emitter of transistor 67a is more negative than the voltage applied to the emitter of transistor 67. As a result, the voltage at electrode 64A of capacitor 64 necessary for turning on transistor 67A must fall below the value necessary for turning on transistor 67. Hence, if an imbalance occurs, detector 21 initiates an alarm after a certain delay; if the imbalance persists, detector 22 initiates a control function after a further delay. The levels at which detectors 21 and 22 operate may be adjusted by means of resistor 61 in the current sink to suit the particular machine being protected against excessive out of balance currents. This resistor may be calibrated directly in terms of imbalance, from 10 percent to 30 percent for example. The level at which the alarm detector operates is, for example, set at about 67 percent of that of the trip detector.

It was pointed out earlier that if the signals put into the three sections 2A, 2B and 2C of the differential integrator 16 are designated $a$, $b$ and $c$ respectively, then the output voltage at 47A will be $(b-a)$, at 47B $(c-b)$ and 47C $(a-c)$. The positive pulses $a$, $b$ and $c$ put in are illustrated graphically in FIG. 4 at 81A, 81B and 81C. The output voltages are DC voltages and will be either positive or negative depending upon the relative values of $a$, $b$ or $c$. If either the positive or the negative voltages are now summed, the magnitude of the sum gives an indication of the extent that the currents flowing in lines 10 are out of balance. In the circuit shown in FIGS. 2 and 3, the positive voltages are eliminated and the negative voltages are summed by means of amplifier 18. If no time delay is necessary, the output voltage of amplifier 18 may be measured directly, that is, current sink 19 and time delay circuit 20 are eliminated. This may be satisfactory in some cases, but not in the case of a dynamoelectric machine where immediate tripping of the breaker in response to an imbalance is not wanted.

For purposes of this invention, current imbalance in lines 10 is defined as the difference in magnitude between the highest and the lowest currents. This may be expressed as a percentage of the full load current. Assuming that the currents of phases A, B and C have magnitudes $a$, $b$ and $c$ respectively, the inputs to the differential integrator are as follows: $(b-a)$, $(c-b)$ and $(a-c)$. If now these three expressions are combined by simple algebra, the following holds:

$$(b-a) + (c-b) = (a-c) = 0.$$

Since the sum of the three expressions in parenthesis is equal to zero, then two of them must be of one sign and the third of the opposite sign, i.e., two positive and one negative or vice versa. Hence the sum of the two of the same sign is equal in magnitude to the third of the opposite sign. It follows, therefore, that the third expression is the largest and its magnitude represents the difference between the largest and the smallest of the three integers $a$, $b$ and $c$. Hence, for any three values the sum of the positive differences =
the sum of the negative differences =
the difference between the highest and lowest.

By way of example to illustrate this point, consider again the equation $$(b-a) + (c-b) + (a-c) = 0$$

now if $(b-a) + (c-b) = -(a-c) = -a + c$, then $c$ is the larger of the three integers $a$, $b$ or $c$ and $a$ the smaller.

Although the circuit shown in FIGS. 2 and 3 deals with the negative differences, it is equally feasible to use the positive differences. Similarly, the inputs to differential integrator 16 need not be positive pulses such as shown in FIG. 4; they may be negative pulses. In the system shown in FIG. 1, the inputs for the differential integrator come from the three phase AC supply via the current-into-voltage transducers, half wave rectifier and the voltage clamp. These inputs to the differential integrator may come from sources other than a three phase AC supply and be used for purposes other than determining current imbalance in the supply. Any three different signals of the same polarity may be processed by the differential integrator and the output therefrom used to determine the extent of the differences.

Figure 5:
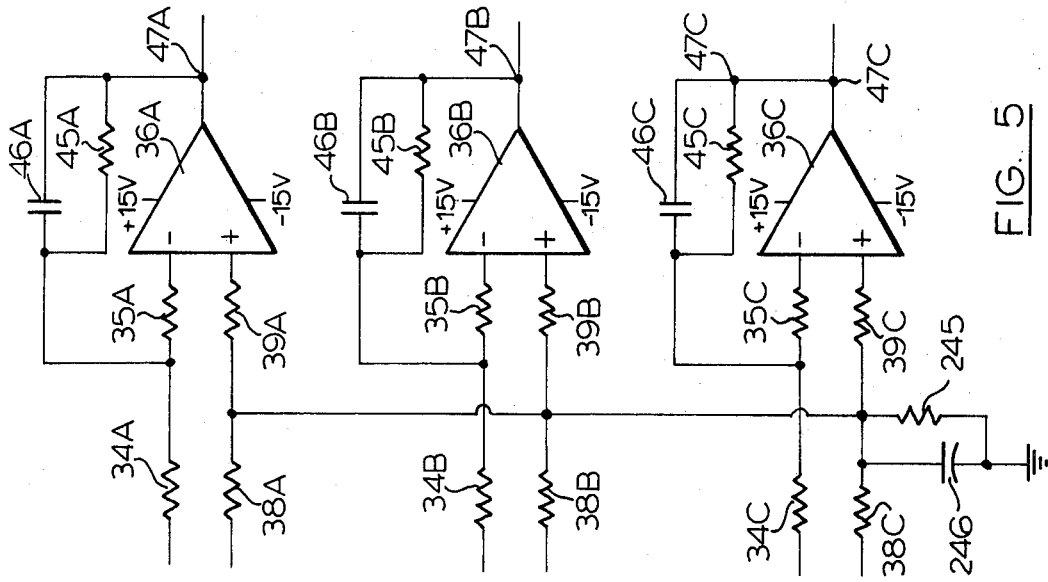
FIG. 5 is a circuit diagram of a modified differential integrating circuit.

The circuit shown in FIGS. 2 and 3 detects the difference between the lowest and the highest integers $a$, $b$ and $c$. This, then, represents the difference between the smallest and the largest of the line currents. By modifying the differential integrating circuit as shown in FIG. 5, it is now possible to detect the difference between an average of the three line currents and the largest of the three. The resistor 145 capacitor 146 network connected to the non inverting input of each operational amplifier 36 in FIG. 2 is dispensed with in FIG. 5 and replaced by a single network of resistor 245 and capacitor 246. The parallel combination of resistor 245 and capacitor 246 is connected to ground and to the non inverting input of all three operational amplifiers. Hence, the signal now impressed on the non inverting inputs of the three amplifiers is an average of the three signals.

The operation of the FIG. 5 circuit is similar to the one described. The differences lies in the definition of imbalance. The first is based on an imbalance definition expressed as the difference between the highest and the lowest current magnitudes as a percentage of the full load current. The FIG. 5 circuit is based on a definition expressed as the maximum current magnitude deviation from the average value of the three current magnitudes as a percentage of the full load current.

Four integers are involved in the theory of operation of the FIG. 5 circuit. There are the original three, namely, $a$, $b$ and $c$, and a fouth "$d$" to represent the average of the three. The outputs from the three differential integrating circuits can now be expressed as $(d-a)$, $(d-b)$, and $(d-c)$ respectively.

Since $d = (a + b + c)/3$ then $$(d-a) + (d-b) + (d-c) = 0.$$

Since the sum of the three expressions in parenthesis is equal to zero, then two of them must be of one sign and the third of the opposite sign, i.e., two positive and one negative or vice versa. Hence, as before, the sum of the two of the same sign is equal in magnitude to the third of the opposite sign. It follows, therefore, that the third expression is the largest and its magnitude represents the difference between the largest of the integers $a$, $b$ or $c$ and the average thereof $d$. Hence in the FIG. 5 circuit the sum of the positive differences =
the sum of the negative differences =
the highest difference between any one and the average of all three.

The embodiments of the invention in which an exclusive property or privilege is claimed are defined as follow:

1. A circuit for detecting the largest of three electric signals of like polarity comprising three differential integrating circuits, each circuit having two inputs and one output; means for applying two different ones of said three signals to the respective inputs of each integrating circuit, each one of said integrating circuits integrating the difference between its input signals and giving an output signal proportional to this difference; means for selecting signals of the same polarity from said output signals; means for summing all said selected signals and outputting a voltage representative of the algebraic sum thereof; and means for detecting the signal level of the sum of said selected signals.

2. The circuit defined in claim 1 characterized by the provision of time delay means between said summing means and said level detecting means for delaying detection of said summed signals subsequent to the initial energization of said circuit.

3. The circuit defined in claim 1 wherein each one of said differential integrating circuits comprises an operational amplifier and capacitance means connected in the configuration of a differential integrator; and resistance means in parallel with said capacitance means for limiting the output of said amplifier to a value proportional to the difference of its inputs.

4. The circuit defined in claim 3 wherein said circuit includes means for obtaining said three electric signals from a three phase AC source as functions of the currents therein.

5. The circuit defined in claim 3 wherein said circuit includes means for obtaining said three electric signals from a three phase AC source as functions of the currents therein, and also means for initiating a control function in response to the detection of a certain signal level by said signal level detecting means.

6. A circuit for detecting current imbalance in a three phase AC source comprising current-into-voltage transducing means for each phase line of said source for producing an AC voltage that is a function of the line current; half-wave rectifying means for converting the three AC voltages into three trains of pulses of like polarity; three differential integrating circuits, each circuit having two inputs and one output; means for applying two different ones of said three trains of pulses to the respective inputs of each integrating circuit, each one of said integrating circuits integrating the difference between its inputs and giving a DC output proportional to this difference; half-wave rectifying means for converting the DC outputs from said integrating circuits into DC signals of like polarity; means for summing said DC signals; means for detecting the level of the sum of said DC signals and initiating a control function at a predetermined value of said level; and time delay means connected to the output of said summing means and to said level detecting means for delaying the initiation of said control function.

7. The circuit defined in claim 5 wherein said circuit includes means for limiting the amplitude of the pulses of said trains of pulses.

8. The circuit defined in claim 6 wherein said time delay means comprises a current sink and a capacitor-resistor circuit, said capacitor receiving charge from a DC source and supplying current to said sink, the magnitude of said current supplied to said sink being controlled by the sum of said DC signals, and said level detector detecting the voltage on said capacitor.

9. The circuit defined in claim 6 wherein each one of said differential integrating circuits comprises an operational amplifier and capacitance means connected in the configuration of a differential integrator; and resistance means in parallel with said capacitance means for limiting the output of said amplifier to a value proportional to the difference of its inputs.

* * * * *